H. R. CONKLIN.
APPARATUS FOR CLEANING COAL, &c.
APPLICATION FILED DEC. 27, 1917.
1,290,515.
Patented Jan. 7, 1919.
2 SHEETS—SHEET 1.
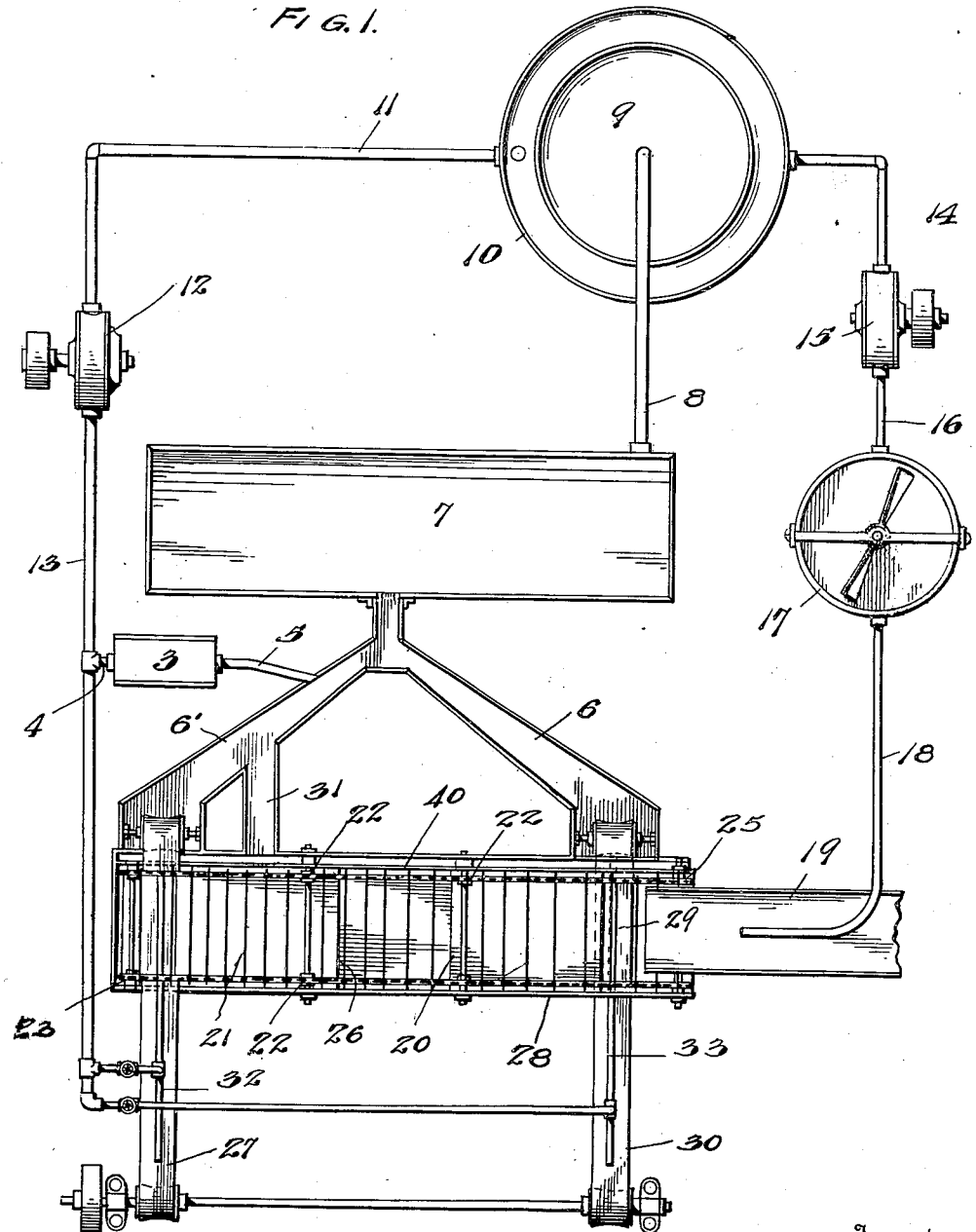
Inventor
Harry R Conklin
By Henry Orth
Attorney

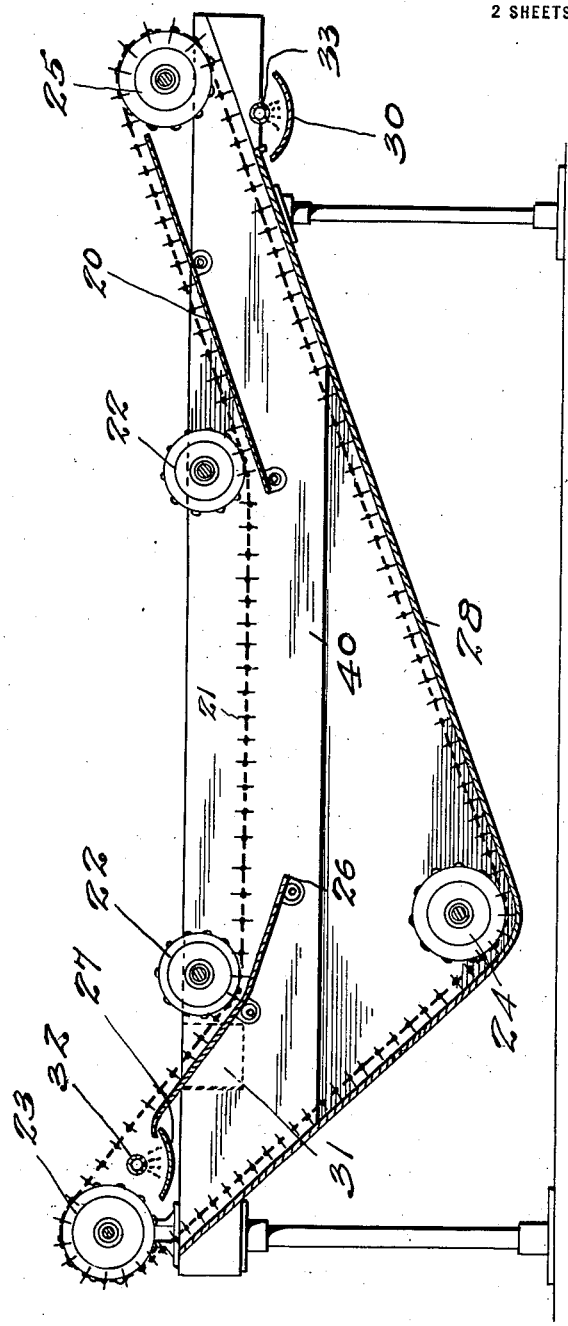

UNITED STATES PATENT OFFICE.

HARRY R. CONKLIN, OF JOPLIN, MISSOURI.

APPARATUS FOR CLEANING COAL, &c.

1,290,515.          Specification of Letters Patent.     Patented Jan. 7, 1919.

Application filed December 27, 1917. Serial No. 209,101.

*To all whom it may concern:*

Be it known that I, HARRY R. CONKLIN, a citizen of the United States of America, residing at Joplin, Jasper county, Missouri, have invented certain new and useful Improvements in Apparatus for Cleaning Coal, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the cleaning of dirty coal, by separating the coal from slate, bone, or other impurities or admixtures heavier than coal, which are usually present in coal as mined.

Heretofore it has been customary to form a separating solution having a gravity greater than coal, and to separate the coal by floating it off from such a solution. Such solutions are expensive, and are only used in laboratory methods, and not on a commercial scale.

It has also been proposed to use a mixture of clay and water, or loam and water, or marl and water, maintained agitated by an upwardly directed current of such mixture, to prevent the mixture from settling, and to maintain such an energetic circulation as will provide a moving mixture which, as a whole, has a specific gravity greater than coal.

It has also been proposed to make use of sand and water maintained agitated, for the same purpose.

None of these mixtures are sufficiently stable to effect the separation of the coal without additional agitation, such as by stirrers, or by an upwardly directed current through a body thereof.

I have discovered that a pulp made from a mixture of mineral slimes and water, free from sand and large particles, will be sufficiently stable during operating conditions to permit the separation of the coal from the impurities by gravity alone, thereby dispensing with any special means for providing agitation.

Specifically, this mixture, and the one which I prefer, is clay and water; the clay being free from all sand and large particles, and sufficiently fine to remain in suspension in water during operating conditions and to produce a separating liquid, pulp, or suspension having a specific gravity greater than that of the coal to be separated, so that the coal will float on the surface of this pulp, and may be scraped therefrom, while the slate and bone, as well as the pyrites, or other iron combinations, will sink to the bottom of the body of such liquid, from which point it may be separately removed.

In the annexed drawings I have diagrammatically shown, in Figure 1 a plant for separating coal, and in Fig. 2 a detailed section of the separating device.

Referring more particularly to Fig. 1, 3 is a grinder for the clay or slate, in which the comminution is carried to a fine degree, water being admitted through a branch pipe 4 to the grinder. The grinder discharges through a launder 5, which discharges to a classifier 7 where all the coarse material is removed from the product, resulting from the grinder 3, and only the fine, suspended particles are carried through a launder 8 to a thickener 10 from which the clear water is delivered by pipe 11 to a pump 12 which supplies a pipe line 13, supplying the grinder and supply pipes hereinafter referred to. The thickened mud, taken from the bottom of the thickener 9, passes by pipe 14 to a pump 15, whence it is delivered by pipe 16 to the pulp mixer 17 provided with stirrer means, or equivalent means, for maintaining the pulp in a thoroughly mixed condition and of the proper specific gravity. Water may be added to the pulp in the mixer, if necessary, to bring the pulp to the proper specific gravity.

The pulp mixer delivers by gravity through a pipe 18 pulp of the proper consistency to the supply chute 19 by which the dirty coal is delivered to the separator. This chute delivers coal onto a downwardly inclined plate 20, (Fig. 2) and it is carried therealong by means of an endless scraper conveyer 12 passing guide sprockets 22, 23, 24 and 25.

Spaced from the end of the plate 20 is an upwardly inclined plate 26 along which the clean coal is carried by the scraper conveyer 21 onto an endless carrier apron or belt 27. The conveyer then passes over guide sprockets 23 above the belt 27 and down into the bottom of the tank 28, around guide sprockets 24, and thence up along the inclined bottom of the tank through the end thereof, carrying with it the slate that has sunk through the suspension, and discharging said slate at 29 onto an endless carrier or apron 30.

The guide sprockets 22 are so located as to maintain that portion of the carrier between them at about the level of the pulp in the tank.

Inasmuch as there is a constant supply of pulp with the coal, and in order to maintain a definite liquid level, there is provided at one side of the tank an overflow 31, discharging into the launder 6'.

Along both of the belts 27 and 30 are provided sprinkler pipes 32 and 33 respectively, which deliver water to the separated coal on belt 27 and to the slate on belt 30, in order to wash them clean and to return the usable pulp adhering thereto into the cycle of operations.

The belts 27 and 30 are dished, or trough-shaped, in order to carry water, and they are inclined toward the launders 6 and 6', and discharge thereon. The launder 6' gathers ground pulp from the launder 5, pulp washed from the coal on belt 27, and pulp overflowing from the tank 28 at 31, and returns it all to the classifier 7 where it is freed from all material unsuitable for the suspension or pulp utilized in the process. The launder 6 discharges pulp washed from the slate on belt 30 also into the classifier 7.

It will thus be seen that in the separator tank 28 the pulp or suspension is maintained of sufficient specific gravity to float coal, but not to float any admixed heavier foreign material. The coal floats on the surface of the pulp in tank 28, while the slate, bone and other heavy impurities sink through the pulp between the plates 20 and 26 onto the inclined bottom of the separating tank and are carried out of the tank by said chain and delivered to the slate conveyer belt 30, while the coal which floats on the surface of the pulp is carried along by the endless carrier out of the pulp along the plate 26 and is discharged onto the coal conveyer belt 27. The excess pulp passes under partition 40 to the constant level overflow 31. Thus it will be seen that the partition 40 not only maintains the body of liquid between the plates 20 and 26 undisturbed by the overflowing liquid, but it withdraws the liquid from below the surface about midway of the depth of the tank and thus draws off from the tank below the separating zone liquid heavily charged with sand and fine impurities leaving a constantly renewed supernatant layer of substantially uncontaminated liquid to effect the separation. The density of this supernatant layer is therefore maintained constant and it not increased by additions from the coal, so that the separation of bone and slate from the coal will always be insured.

The specific gravity of coals vary, and it is sometimes necessary with certain heavy coals to augment the specific gravity of the pulp by adding thereto certain salts, such as sodium chlorid, or by using mine-water containing a sufficient quantity of sulfate of iron and other salts in solution.

The addition of soluble salts or the equivalent I have found necessary for the heavier coals because of the fact that when a suspension of clay is made up to the specific gravity sufficient to float these coals, the pulp becomes so thick and gelatinous that pieces of slate will not sink through the pulp.

With the lighter coals it will not be necessary to add soluble salts to the pulp.

One great advantage of this method of separation is that the separation will be effected irrespective of the size and shape of the material, which is not the case with the ordinary jigs, or with apparatus in which the separating liquid or medium is agitated.

This advantage is especially noted when fine sulfids are contained in the coal, since any upward agitating current will prevent such fine sulfids from sinking through the separating medium.

Another great advantage is that, aside from the decreased cost of cleaning coal by my method over the methods hereinbefore referred to, I am able to separate a much finer coal than by the use of jigs or other agitating devices, wherein small pieces of slate, bone and the like are unavoidably carried up by the agitating current and remain with the coal.

I claim—

1. A coal separator, comprising a tank free from liquid agitating means having an inclined bottom and a liquid level maintaining overflow discharging liquid from below the surface of the liquid in the tank, an endless conveyer therein, a pair of oppositely inclined spaced plates near the liquid level over which a portion of said conveyer travels, means for delivering coal to be separated onto one of said plates and conveyer, said conveyer moving the coal to the space between said plates where the coal floats and the impurities sink onto another portion of said conveyer, a portion of said conveyer traveling at the surface level and discharging the coal over the end of said other plate at one end of the tank, and another submerged portion of said conveyer discharging the refuse at the other end of said tank.

2. A coal separator comprising a tank, free from liquid agitating means, having an inclined bottom and a liquid-level maintaining overflow, discharging liquid from below the separating zone, an endless conveyer therein, a pair of oppositely inclined spaced plates over which said conveyer travels, means for delivering coal to be separated onto one of said plates and conveyer, said conveyer having a stretch at the liquid level moving the coal to the space between the plates, where the coal floats and the impurities sink, means to which said conveyer discharges the separated coal from the other of said plates, means to which said conveyer discharges refuse, means for washing the coal and refuse free from the separating medium and means for returning the wash into the cycle of operations.

3. A coal separator comprising a tank, free from liquid agitating means, having an inclined bottom and a liquid-level maintaining overflow, an endless conveyer therein, a pair of oppositely inclined spaced plates over which said conveyer travels, means for delivering coal to be separated to one of said plates and conveyer, said conveyer moving the coal to the space between the plates, where the coal floats and the impurities sink, means to which said conveyer discharges the separated coal from the other of said plates, means to which said conveyer discharges refuse, means for continuously supplying pulp to said tank, means for washing the coal and refuse free from the separating medium and means for returning the wash and pulp from said overflow into the cycle of operations.

4. Apparatus for separating coal, comprising a grinder for argillaceous material, a flotation classifier for said ground material, a thickening device for the separated fines, a mixer into which the settled fines are brought to a pulp of the proper gravity, a tank, means to supply the pulp and coal to said tank, means to separately remove the coal and heavier impurities from said tank, means to supply wash water decanted from said thickening device to said coal and to said impurities, and means to return the wash and overflow from said tank to said classifier.

In testimony that I claim the foregoing as my invention, I have signed my name hereto.

HARRY R. CONKLIN.